United States Patent [19]

Patel et al.

[11] Patent Number: 5,095,313

[45] Date of Patent: Mar. 10, 1992

[54] TRANSIENT GLITCH CANCELLATION NETWORK

[75] Inventors: Salim Patel, Hawthorne; Edward Jhu, Los Angeles, both of Calif.

[73] Assignee: Hughes Aircraft Company, Los Angeles, Calif.

[21] Appl. No.: 531,209

[22] Filed: May 31, 1990

[51] Int. Cl.$^5$ ............... G01G 7/285; G01G 7/34
[52] U.S. Cl. ................................. 342/91; 342/92; 342/198; 342/194
[58] Field of Search ............... 342/91, 92, 198, 194

[56] References Cited

U.S. PATENT DOCUMENTS

| | | | |
|---|---|---|---|
| 3,495,244 | 2/1970 | La Rosa | 342/94 |
| 3,778,829 | 11/1973 | Longuemare, Jr. et al. | 342/92 |
| 3,995,271 | 11/1976 | Goggins, Jr. | 342/91 |
| 4,047,172 | 9/1977 | Bauer et al. | 342/91 |
| 4,095,226 | 6/1978 | Kratzer | 342/393 |
| 4,222,049 | 9/1980 | Sirven et al | 342/91 |
| 4,225,865 | 9/1980 | McPherson | 342/92 |
| 4,528,565 | 7/1985 | Hauptmann | 342/91 |
| 4,571,590 | 2/1986 | Bennett | 342/92 |
| 4,680,588 | 7/1987 | Cantwell | 342/92 |
| 4,710,772 | 12/1987 | Cantwell et al. | 342/92 |
| 4,891,649 | 1/1990 | Labaar et al. | 342/203 |
| 4,920,346 | 4/1990 | Huntley | 342/91 |

Primary Examiner—John B. Sotomayor
Attorney, Agent, or Firm—Leonard A. Alkov; Wanda K. Denson-Low

[57] ABSTRACT

A gain control network having a phase splitter circuit responsive to an RF input signal for providing first and second RF signals that are out of phase relative to each other, a first series of switched gain control elements, and a second series of switched gain control elements substantially identical to the first series and commonly controlled therewith. The first series of gain control elements is responsive to the first RF signal for providing a first gain controlled signal, and the second series of switched gain control elements is responsive to the second RF signal for providing a second gain controlled signal. A phase combining circuit combines the first and second gain controlled signals to provide a gain controlled RF output. By performing gain control with two gain control channels having substantially identical circuits and common switching control, transient glitches in each of the channels are substantially identical and are substantially cancelled via the phase combiner.

5 Claims, 2 Drawing Sheets

TRANSIENT GLITCH CANCELLATION NETWORK

BACKGROUND OF THE INVENTION

The present invention is directed generally to gain control techniques, and is directed more particularly to a switched gain control network which substantially reduces noise due to the switching signals used to control the network.

In RF applications, such as radar receivers, gain control elements such as gain control blocks or transfer switches are utilized to control the level of the input signal to an analog-to-digital (A/D) converter. Generally, a gain control block is a circuit with two RF paths between its input and its output, wherein one path provides no attenuation or amplification while the other path provides attenuation or amplification. The path that is enabled is selected by a switching command signal to the gain control block.

Gain control blocks are utilized in radar systems for the following reasons.

In a radar system, a pulse, modulated with a carrier, is transmitted, and by observing the characteristics of the return pulse, information about the target, free space, or ground objects can be deciphered. The amplitude of the return pulse varies in proportion with the distance between the radar antenna and the object. In order to maintain a constant amplitude at the input of the an A/D (analog-to-digital) converter, and to prevent saturation of associated circuitry, gain control circuitry is used to automatically adjust the output to a constant level. In a modern radar system, like the ones used in fighter aircrafts, the gain controlling function is achieved by a digital command received from an on-board computer which monitors the amplitude of the pulse near the input of the A/D converter. Operating in closed loop environment, this digital command is automatically adjusted such that the amplitude of the pulse is maintained at a constant level.

Serially connected gain control blocks are commonly utilized to provide the desired level control pursuant to respective control signals that are selected to provide different amounts of attenuation or amplification. For example, such gain control blocks can be binarily weighted in dBs so that integral multiples of the least attenuation or amplification can be selected.

A consideration with the use of gain control blocks as well as other gain controlling switching circuitry are the transient "glitches" or spikes that appear on the input signal being controlled due to the switching of the gain control blocks. The glitches propogate through the gain control blocks and are ultimately amplified, appearing at the amplifier output as unwanted distortion. Efforts to control the transient glitches due to switching have included filtering of the command pulses. However, since filtering reduces bandwidth and increases switching time, filtering results in slower switching speeds.

SUMMARY OF THE INVENTION

It would therefore be an advantage to provide a switched gain control network that provides for substantially reduced transient switching distortion.

The foregoing and other advantages are provided in a gain control network that includes a phase splitter circuit responsive to an RF input signal for providing first and second RF signals that are out of phase relative to each other, a first series of switched gain control elements, and a second series of switched gain control elements substantially identical to the first series and commonly controlled therewith. The first series of gain control elements is responsive to the first RF signal for providing a first gain controlled signal, and the second series of switched gain control elements is responsive to the second RF signal for providing a second gain controlled signal. A phase combining circuit combines the first and second gain controlled signals to provide a gain controlled RF output. By performing gain control with two gain control channels having substantially identical circuits and common switching control, transient glitches in each of the channels are substantially identical and are substantially cancelled via the phase combiner.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION OF THE DISCLOSURE

Figure 1:
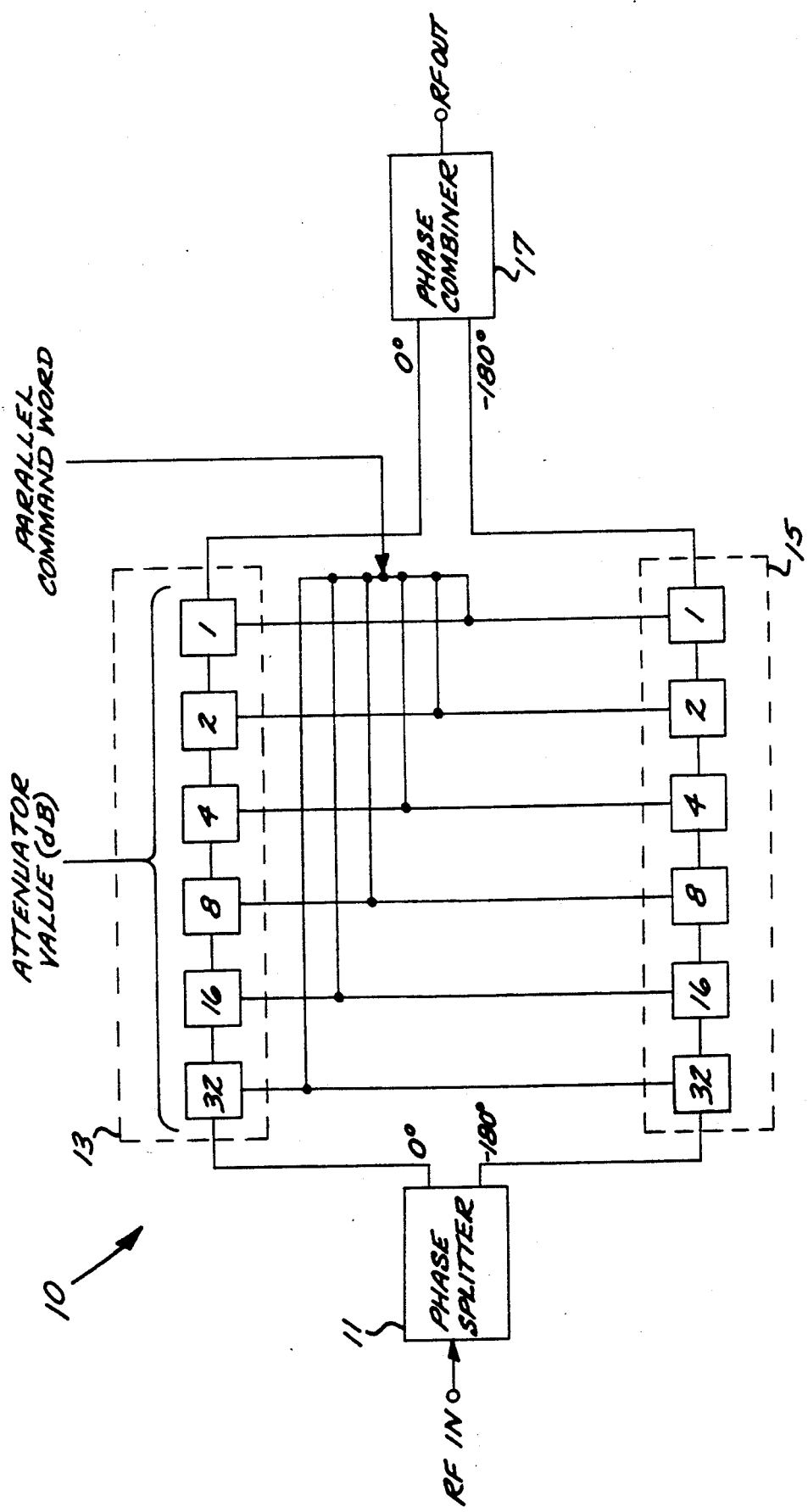
FIG. 1 is a schematic block diagram of a gain control network in accordance with the invention.

In the following detailed description and in the several figures of the drawing, like elements are identified with like reference numerals.

Referring now to FIG. 1, set forth therein is a gain control network 10 which includes a phase splitter 11 for receiving an input RF signal and provides first and second output signals that are 180 degrees out-of-phase. In particular, the first signal is a 0 degree signal, while the second signal is the −180 degree signal. By way of example, the phase splitter can also comprise a differential output.

The 0 degree signal is provided as the input to a first group of serially connected gain control blocks 13, and the −180 degree signal is provided as the input to a second group of serially connected gain control blocks 15. The first and second groups of gain control blocks are substantially identical networks of gain control, and are closely matched in gain and phase. In particular, each gain control block in each group has a corresponding gain control block in the other group, wherein corresponding gain control blocks are located in the same position within the group and provide substantially the same attenuation.

By way of illustrative example, as shown in FIG. 1, each group of serially connected gain control blocks includes binarily gain controlled blocks that individually provide respective attenuations of 32, 16, 8, 4, 2 and 1 dB, wherein each gain control block provides either no attenuation or its specified attenuation in response to the state of the controlling command bit.

The first and second groups of gain control blocks are controlled by parallel command words that are provided to the groups in parallel so that corresponding gain blocks in each group receive the same command bit at the same time. Thus, for each given command word, each group will provide substantially the same attenuation.

It should be appreciated that depending upon the technology utilized to implement the gain control blocks, each of the bits of the command word can comprise a single signal or complementary signals.

The outputs of the first and second gain control groups are provided as inputs to a phase combiner 17 which combines the signals to provide a phase combined signal that is provided to a buffer amplifier 19, for example. By way of example, the phase combiner 17 can also comprise a differential amplifier having a differential input and a single-ended output.

With the foregoing gain control network 10, the primary input signal is divided into out-of-phase components which are processed substantially identically via two channels. During such gain control processing, the out-of-phase components are contaminated by the command pulse switching which produces transient glitches that are in-phase as between the two channels. When the two channels are combined by the phase combiner 17, the in-phase transient glitches tend to cancel, while the in-phase components of the primary signal are added to provide a single gain controlled primary signal. Thus, the signal contaminating glitches added by the command word switching are substantially reduced.

Figure 2:
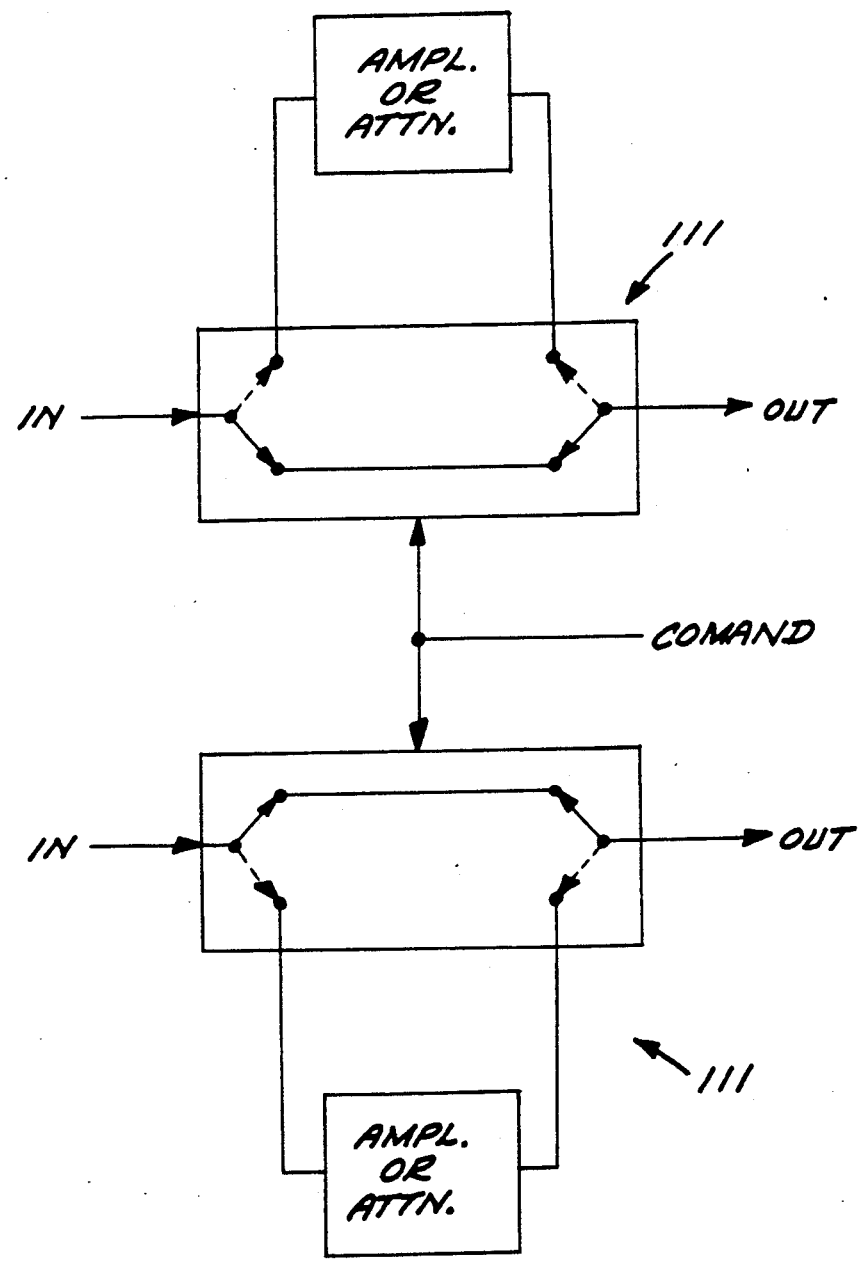
FIG. 2 is a schematic diagram of gain control blocks that can be utilized in the gain control network of FIG. 1.

Referring now to FIG. 2, shown therein is a schematic diagram of corresponding gain control blocks 111 as can be utilized in the gain control network 10 in accordance with the invention. Each gain control block 111 essentially includes a double-pole, double throw switch that is controlled by the appropriate command word bit. In one state, the input signal is connected directly to the output of the gain control block, whereby the gain of the signal is not changed. In the other state, the gain of the input signal is changed, for example, by amplification or attenuation.

It should be appreciated that the foregoing phase cancelling gain control technique can be implemented with other RF gain controlling networks wherein gain is controlled by switching elements that contaminate the signal being processed.

The foregoing has been a disclosure of a switched gain control network that advantageously reduces contamination due to switching transients without reducing switching speeds, and is readily implemented with known switched gain controlling elements.

Although the foregoing has been a description and illustration of specific embodiments of the invention, various modifications and changes thereto can be made by persons skilled in the art without departing from the scope and spirit of the invention as defined by the following claims.

What is claimed is:

1. An RF gain control network comprising:
    a phase splitter responsive to an RF input signal for providing first and second RF signals that are 180 degrees out-of-phase relative to each other;
    first controllable gain controlling means responsive to said first RF signal for providing a first gain controlled signal that includes first transients caused by control of said first gain controlling means;
    second controllable gain controlling means, substantially identical to said first controllable gain controlling means and controlled in parallel therewith, responsive to said second RF signal for providing a second gain controlled RF signal that includes second transients caused by control of said second gain controlling means, said second transients being substantially in phase with said second transients; and
    phase combining means for combining said first and second gain controlled RF signals to provide a gain controlled RF signal based on the RF input signal, whereby said first transients and said second transients substantially cancel each other.

2. The gain control network of claim 1 wherein said first gain controlling means comprises first serially connected gain controlling elements, and wherein said second gain controlling means comprises a group of serially connected gain controlling elements substantially identical to said first serially connected gain controlling elements.

3. The gain control network of claim 1 wherein said splitting means comprises a differential amplifier having a single-ended input and a differential output.

4. The gain control network of claim 1 wherein said phase combining means comprises a differential amplifier having a differential input and a single-ended output.

5. An RF gain control network comprising:
    a phase splitter responsive to an RF input signal for providing first and second RF signals that are 180 degrees out-of-phase relative to each other;
    a first switched gain control channel responsive to said first RF signal for providing a first gain controlled signal that includes first transients caused by switching of said first gain control channel;
    a second switched gain control channel, substantially identical to said first gain control channel and controlled in parallel therewith, responsive to said second RF signal for providing a second gain controlled RF signal that includes second transients caused by switching of said second gain controlled channel, said second transients being substantially in phase with said first transients; and
    phase combining means for combining said first and second gain controlled RF signals to provide a gain controlled RF signal based on the RF input signals, whereby said first and second transients substantially cancel each other.

* * * * *